UNITED STATES PATENT OFFICE.

BERTRAM LEVIN, OF HALE, ENGLAND.

TANNING COMPOUND.

1,323,878.   Specification of Letters Patent.   Patented Dec. 2, 1919.

No Drawing.   Application filed May 28, 1918.   Serial No. 237,131.

*To all whom it may concern:*

Be it known that I, BERTRAM LEVIN, a subject of the King of Great Britain, residing in Hale, England, have invented a certain new and useful Tanning Compound, of which the following is a specification.

Pyrophosphoric acid has a marked tendency to form with metals complex acids which may be termed metallopyrophosphoric acids. Chromopyrophosphoric acid and ferro- and ferripyrophosphoric acids are notable examples. Certain of these acids or their salts have found industrial application, particularly in tanning.

I have found that certain advantages accrue if such metallopyrophosphoric acids or their salts are associated with boron compounds or contain boron. These advantages are mainly connected with ease of manufacture of the substance, with the stability of the product and with the effect of the product when used, say, in tanning.

My invention consists in making metallopyrophosphoric acids or their salts associated with an oxid or oxy-acid of boron or containing boron as a part of the composition of the acid or salt.

For this purpose the manufacture may be analogous to the known processes for making the metallopyrophosphoric acids or their salts, there being substituted for the pyrophosphoric acid used, a pyrophosphoboric acid, such as the acid made in accordance with my British patent specification No. 7015 of 1917, to which I have ascribed the formula $BHP_2O_7$.

Or a pyrophosphoboric acid (or mixture of boric acid and pyrophosphoric acid) may be heated with a compound of the metal in question, whereby the advantage is realized that the boric and pyrophosphoric acid radicals are of such stability that other acid radicals are expelled at the temperatures used, which must not exceed that at which the pyrophosphoric acid is destroyed, generally about 300° C.

In the preferred mode of making the products the pyrophosphoric acid radical is made by the same heating operation that produces the product.

For example in preparing a chromium product, any convenient chromous or chromic salt may be mixed with boric oxid or acid and with phosporic acid (commercial ortho-phosphoric acid) and the mixture heated at a temperature high enough to convert any ortho-phosphoric acid into pyrophosphoric acid but not to destroy the latter. The stability imparted to the pyrophosphoric acid by the boric acid radical considerably facilitates the heating operation and permits a temperature at which other acid radicals present can be expelled.

A suitable mixture for heating would be one of chrome alum, boric acid and phosphoric acid containing the elements in the ratio $$Cr:B:P_2O_5 = 52:44:600.$$

The ingredients may be heated while they are being mixed and the heating continued until a heavy mobile mass is obtained and the temperature exceeds 250° C. The mass is then poured into trays or on to slabs which are heated until a substantially anhydrous mass showing reaction of pyrophosphoric acid is obtained.

Similar procedure is applicable when other metallopyrophosphoric acids or their salts are being made; particularly, those of aluminium, iron, tungsten or manganese.

The products are less hygroscopic and less liable to revert to ordinary phosphates than the metallopyrophosphates previously known.

My invention includes an improvement in tanning by means of metal salts, for which purpose a metallopyrophosphoric acid associated with a boron compound or containing boron, such as can be made as herein described, and containing a metal known to have a tanning action, is used in the tanning bath under such conditions as are known to be suitable for the said tanning action of that metal. The process is improved mainly owing to the fact that a material is applied which is more soluble in water than the ordinary metallopyrophosphates, and that the metallic salts in such prepared tanning solutions possess greater penetrative power than ordinary pyrophosphates in respect to the hides undergoing treatment; and that the process of treatment admits of the metallic pyrophosphate actually being rendered insoluble within the pores of the hides by the simple process of neutralizing the acidity of a tannage.

Having thus described the nature of the said invention and the best means I know of carrying the same into practical effect, I claim—

1. As a new article of manufacture a salt of a metallopyrophosphoric acid containing boron as a part of the acid radical, which article is a solid less hygroscopic and less liable to revert to ordinary metallic phosphate than is the corresponding metallopyrophosphate.

2. As a new article of manufacture, a hydrogen metallopyrophosphate containing boron as a part of the acid radical, which article is a solid less hygroscopic and less liable to revert to ordinary metal phosphate than is the corresponding hydrogen metallopyrophosphate.

3. As a new article of manufacture a salt of chromopyrophosphoric acid containing boron as a part of the acid radical, which article is a solid less hygroscopic and less liable to revert to chromium phosphate than is the corresponding salt of chromopyrophosphoric acid.

4. As a new article of manufacture, hydrogen chromopyrophosphorate containing boron as a part of the acid radical, which article is a solid less hygroscopic and less liable to revert to chromium phosphate than is chromopyrophosphoric acid.

In testimony whereof I have signed my name to this specification in the presence of two subscribing witnesses.

BERTRAM LEVIN.

Witnesses:
  FRANK ARTHUR HEYS,
  DORIS ELIZABETH BODEN.